United States Patent [19]
Presher et al.

[11] Patent Number: 5,815,932
[45] Date of Patent: Oct. 6, 1998

[54] UNDERCUTTER ATTACHMENT

[76] Inventors: James E. Presher; Shirley M. Presher, both of 1353 Old Pondella Rd., North Ft. Myers, Fla. 33903

[21] Appl. No.: 746,678

[22] Filed: Nov. 14, 1996

[51] Int. Cl.$^6$ .................................................. B23D 47/02
[52] U.S. Cl. ........................................ 30/373; 144/136.95
[58] Field of Search ....................... 30/373; 144/136.95, 144/154.5, 48.5, 35.2, 368

[56] References Cited

U.S. PATENT DOCUMENTS

| | | | |
|---|---|---|---|
| 2,610,658 | 9/1952 | Koeling | 30/373 |
| 2,705,513 | 4/1955 | Moeller | 144/136.95 |
| 2,741,282 | 4/1956 | Wieting | 144/136.95 |
| 2,823,713 | 2/1958 | Goldsmith | 144/136.95 |
| 3,716,917 | 2/1973 | Ruben | 144/136.95 |

*Primary Examiner*—Hwei-Siu Payer
*Attorney, Agent, or Firm*—Dorothy S. Morse

[57] ABSTRACT

An attachment for use with a high speed mini-grinder which helps persons laying tile to undercut baseboards and door trim adjacent to a tiled surface for insertion thereunder of the edge of each perimeter tile so as to eliminate grout lines which would otherwise be required around the edge of the tiled surface. The attachment comprises a cutting blade with negative hook, an outwardly biased telescoping blade guard to cover the cutting blade at all times except when in use, a frame that is vertically adjustable for making cuts of different heights to accommodate tiles of different thickness, countersunk screws to connect the cutting blade to mounting bracket attached to the mini-grinder, and an adjustable depth stop for setting the maximum depth of the cut made into a baseboard or door trim. Applications may include, but are not limited to, use in cutting door trim including door jambs, door casings, and door stops, as well as base molding preparatory to the laying of floor tile.

10 Claims, 2 Drawing Sheets

UNDERCUTTER ATTACHMENT

BACKGROUND—FIELD OF INVENTION

This invention relates to attachments for use with grinders and similar power-driven hand tools, specifically to an attachment for use with a high speed mini-grinder which helps people laying tile to undercut baseboards and door trim adjacent to a tiled surface for insertion thereunder of the edge of each perimeter tile so as to eliminate a grout line which would otherwise be required around the edge of the tiled surface and the exposure of unevenly cut and trimmed tile edges. Applications may include, but are not limited to, use in cutting door trim including door jambs, door casings, and door stops, as well as base molding preparatory to the laying of floor tile.

BACKGROUND—DESCRIPTION OF PRIOR ART

The appearance of a tiled surface can be spoiled by a finished perimeter which is not neat and professional looking. Since it is not usually possible to cover the entire area of a tiled surface with whole tiles, a person laying them must either cut away a portion of the tiles to be placed along one or more perimeter edges of the tiled surface, cut baseboards or door trim around the perimeter of the tiled surface for insertion thereunder of the outer edge of each perimeter tile, or both. Undercutting baseboards and door trim adjacent to a tiled surface is often preferred over laying tile along such surfaces, as it eliminates perimeter grout lines and exposed perimeter tile edges which may not be uniformly cut and trimmed.

Hand tool attachments for undercutting baseboards and door trim are known. Commonly used undercutting attachments, such as a Crain jamb cutting attachment, are made for use with large power-driven hand tools and can be unwieldy to use. Typically, they comprise cutting blades which have a minimum diameter of seven inches. Further, such attachments require a person laying tile to carry an extra power tool to drive them. In contrast, the present invention is powered by a high speed mini-grinder which people laying tile commonly carry with them to smooth the edge of a cut piece of tile. Since the baseboard and door trim undercutting is generally performed prior to laying the tile, use of the present invention with the mini-grinder does not interfere with its later use for other tile laying purposes. Also, prior art attachments, such as the Crain invention, do not have a low profile for getting in close under the toe kick of cabinets. Further, cuts with neat and uniform edges are not always possible with the cutting blades of many commonly used attachments for undercutting as such cutting blades are not always stable upon their base during contact with nails encountered in baseboards and door trim.

Power tool attachments for use with power-driven hand tools are disclosed in U.S. Pat. No. 2,714,905 to Clayton (1955) and U.S. Pat. No. 3,747,650 to Heisler (1973). The Heisler invention is a tool adapter which connects to the base of a hand-held circular blade power saw and comprises a base, a mandrel, a shaft, two pulleys, an endless belt, and means on the end of the shaft for attachment to a variety of types of rotary tools. In contrast, the present invention is not belt driven, nor is it contemplated as a device for facilitating the attachment of other tools to a hand-held power unit. The Clayton invention comprises a saw blade frame with a higher profile than the present invention and does not have a telescoping front member which functions as a blade guard when the cutting blade is not in use. It is not known in this field to have an attachment for use with a high speed common angle mini-grinder comprising a four-and-one-half inch to five-and-one-half inch blade with negative hook, a telescoping blade guard outwardly biased to cover the cutting blade except during actual use, a depth stop for limiting the depth of a cut made by its cutting blade, an adjustable frame for achieving cuts at a variety of heights, and countersunk screws for securing the cutting blade to a mounting bracket attached to the mini-grinder, which helps people laying tile to undercut baseboards and door trim adjacent to a tiled surface for insertion thereunder of the edge of each perimeter tile so as to eliminate grout lines which would otherwise be required around the edge of the tiled surface, as well as the exposure of perimeter tile edges which may not be uniformly cut and trimmed.

SUMMARY OF INVENTION—OBJECTS AND ADVANTAGES

It is the primary object of this invention to provide an undercutting attachment for use with high speed common angle mini-grinders for the cutting away lower portions of baseboards and door trim adjacent to a tiled surface so that the edge of each perimeter tile can be inserted under the baseboard or door trim for a neat appearance without the need for a grout line around the perimeter of the tiled surface and exposure of perimeter tile edges which may not be uniformly cut and trimmed. It is also an object of this invention to provide an undercutting attachment for use with high speed common angle mini-grinders, a tool most people laying tile already carry with them for smoothing rough edges on tile, to lessen the number of tools that people laying tile need to have available on a job. A further object of this invention is to provide an undercutting attachment which has a low profile to get in close under the toe kick of cabinets. It is also an object of this invention to provide an undercutting attachment with a blade having negative hook which better withstands shock due to contact with nails that a cutting blade is likely to encounter within baseboard and door trim materials. A further object of this invention is to provide an undercutting attachment which is made of durable materials and has a cutting blade that is stable on its frame for smooth, neat, uniform, and professional looking cuts in baseboard and door trim materials. It is also an object of this invention to provide an undercutting attachment which has a telescoping blade guard over its cutting blade that is outwardly biased to protect the otherwise exposed front edge of the cutting blade when the cutting blade is not in use. A further object of this invention is to provide an undercutting attachment which has a frame adjustable for different cut heights to accommodate tiles of varying thickness and a stop for setting the maximum depth of cuts made with its cutting blade. It is also an object of this invention to provide an undercutting attachment which uses countersunk screws for connection of its cutting blade to its mounting bracket. A further object of this invention is to provide an undercutting attachment which is easily and readily connected to and disconnected from a high speed mini-grinder.

As described herein, properly manufactured and attached to a common angle high speed mini-grinder, the present invention would provide a power tool attachment for use by people laying tile to undercut baseboards and door trim so that the edge of perimeter tiles can be inserted under the baseboards and door trim to give the finished tiled surface a more professional appearance. Since the present invention would be attached to a small hand-held power tool and have a cutting blade ranging in size from approximately four and-one-half inches in diameter to five-and-one-half inches in diameter, it would be easier to use than prior art attachments which typically have larger cutting blades. Also, since it is contemplated for the present invention to be attached to a high-speed mini-grinder, a tool that most people laying tile carry with them for other purposes, the present invention would lessen the number of power tools needed to complete a tile laying project. The present invention has a telescoping blade guard which is outwardly biased to protect its cutting blade at all times except when actually used for cutting. Further, the cutting blade of the present invention has a negative hook so that it will be more stable when encountering nails in the material it cuts and provide a more uniformly cut edge. Also, the present invention has countersunk screws to hold the cutting blade onto its mounting bracket and a frame with a low profile for getting in close under the toe kick of cabinets. The frame of the present invention is vertically adjustable to makes cuts for tiles of varying thickness and has a depth stop connected thereto for setting a maximum depth for each cut by limiting backward movement of the telescoping blade guard. The cutting blade also has holes therein for gripping by a removal wrench to provide easy connection and disconnection of the cutting blade from its supporting frame.

The description herein provides preferred embodiments of the present invention but should not be construed as limiting the scope of the undercutting attachment invention. For example, variations in the configuration of the depth stop, the diameter of the cutting blade used, the degree of negative hook in the cutting blade, the number of shoulder screws used to guide the telescoping blade guard when it is moved between its fully extended and fully collapsed positions, the type of materials from which the undercutting attachment is made, the size and configuration of the loops used to engage the guard return spring, and the lateral positioning of the guard return spring and the depth stop on the upper surface of the telescoping blade guard, other than those shown and described herein, may be incorporated into the present invention. Thus the scope of the present invention should be determined by the appended claims and their legal equivalents, rather than the examples given.

DETAILED DESCRIPTION OF PREFERRED EMBODIMENTS

Figure 1:
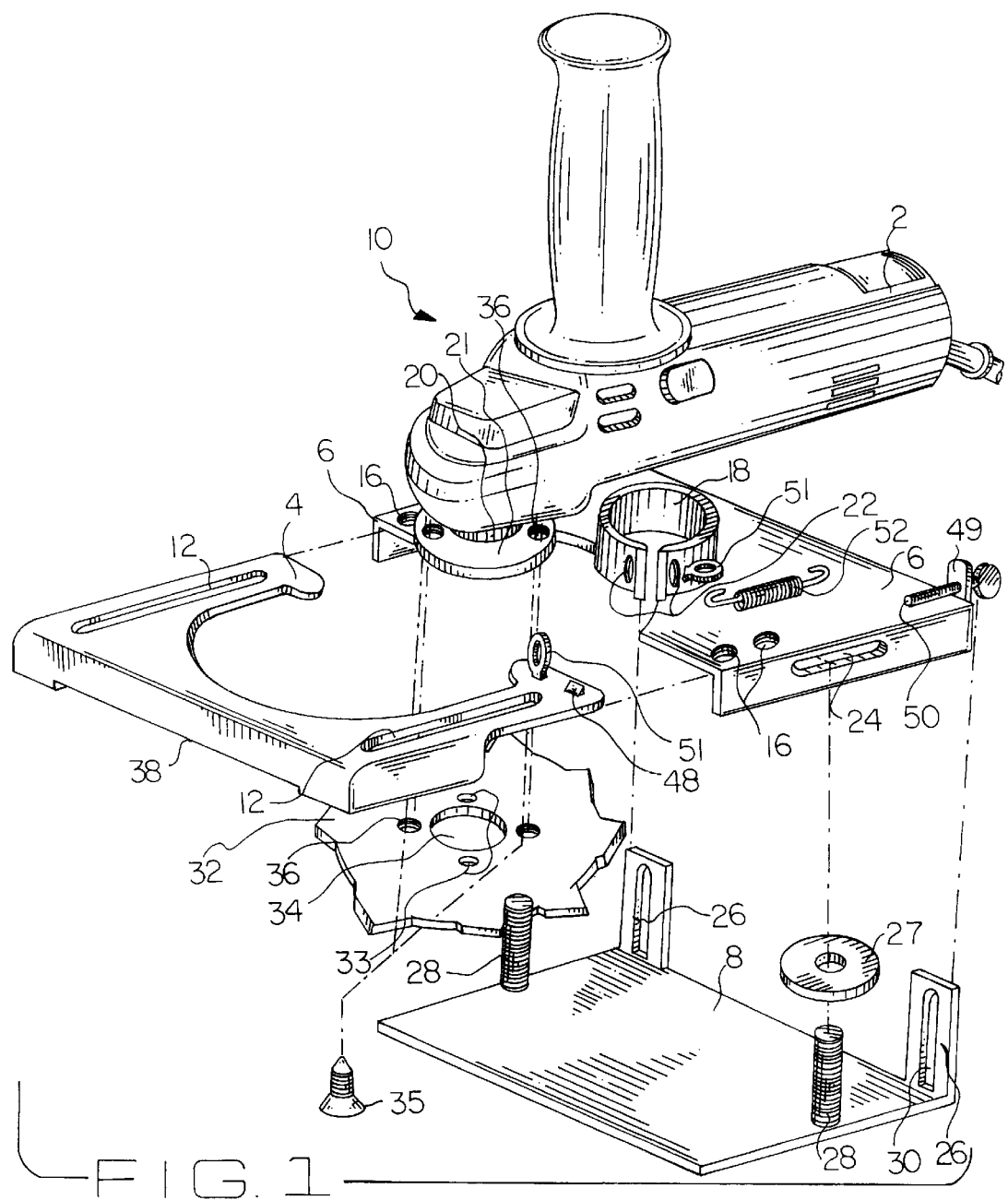
FIG. 1 is an exploded view of the invention and a typical high speed mini-grinder to which the invention would be attached during use.

FIG. 1 shows an exploded view of the components of a preferred embodiment of an undercutting invention 10 ready for assembly and attachment to a side grinder 2. In the preferred embodiment it is contemplated for side grinder 2 to be a high speed common angle type of mini-grinder and comprise a rotating connecting bracket 20 which has a threaded outer perimeter. Connecting bracket 20 is attached to side grinder 2 so that the longitudinal axis of side grinder 2 is perpendicular to the rotational axis of connecting bracket 20, giving the combination of undercutting invention 10 and side grinder 2 a low profile for use in undercutting the toe kick of cabinets (not shown).

FIG. 1 shows undercutting invention 10 having a telescoping blade guard 4, a stationary back frame member 6, a bottom plate 8, and a cutting blade 32 which is positioned therebetween when undercutting invention 10 is assembled. Telescoping blade guard 4 comprises a planar upper surface with a front edge and partial side edges downwardly depending therefrom, the partial side edges being adjacent to the downwardly depending front edge of telescoping blade guard 4. The front edge of telescoping blade guard 4 has an elongated rectangular cutout 38 centrally located through the bottom portion of its perimeter. Telescoping blade guard 4 is movable in a forward direction relative to stationary back frame member 6 into a fully expanded configuration, and rearwardly relative to stationary back frame member 6 into a fully collapsed configuration for exposure of cutting blade 32 through cutout 38 during cutting. The planar upper surface of telescoping blade guard 4 has a substantially U-shaped configuration with an elongated slot 12 located on either arm of its U shape, each slot 12 being oriented in a position parallel to the other slot 12. FIG. 1 also shows a loop 51 and a depth stop 48 upwardly depending from the upper surface of telescoping blade guard 4. The positioning of loop 51 and depth stop 48 are not critical to the present invention and it is contemplated to have loop 51 and depth stop 48 on the left or right rear portion of telescoping blade guard 4.

FIG. 1 shows stationary rear frame member 6 having a planar top surface with a back edge and side edges downwardly depending therefrom. Each side edge of rear frame member 6 has a horizontal slot 24 centrally positioned therethrough. The top surface of rear frame member 6 also has two pairs of top holes 16 therethrough, one top hole 16 of each pair being in a position rearward from the other top hole 16 of its pair. Also, each pair of top holes 16 is laterally positioned through the top surface of rear frame member 6 and positioned close to its forward edge so as to line up with slots 12 for engagement therewith. FIG. 1 also shows rear frame member 6 having a top surface with a hemispherical cutout having its widest portion at the forward edge of rear frame member 6. In addition, a cylindrical upright collar 18 is permanently and centrally affixed to the forward edge of rear frame member 6, with collar 18 having two opposed flanges outwardly depending therefrom. Each of the flanges of collar 18 has a tightening hole 22 therethrough. In FIG. 1 collar 18 is also shown to have a loop 51 attached to its outside surface similar to the loop 51 attached to the upper rear surface of telescoping blade guard 4. FIG. 1 further shows a return spring 52 positioned above rear frame member 6. During use return spring 52 is connected between both loops 51 and functions to return telescoping blade guard 4 into its fully expanded, resting position over cutting blade 32 subsequent to collapse by an outside force applied to its front edge which stretches return spring 52 and exposes cutting blade 32 through cutout 38. As a result, return spring 52 is in its non-extended, resting state when telescoping blade guard 4 is fully extended over cutting blade 32, and return spring 52 is extended when sufficient forward motion is applied to side grinder 2 so that the front surface of telescoping blade guard 4 comes into contact with a work surface, such as baseboard 40 shown as number 40 in FIGS. 2, 3, and 4, and the front surface of telescoping blade guard 4 is caused to moved rearwardly to expose cutting blade 32. When the present invention is assembled for use, and prior to collapse of telescoping blade guard 4, it is contemplated for telescoping blade guard 4 to substantially overlay rear frame member 6. Consequently, in FIG. 1, return spring 52 is shown in its resting, non-extended state and is positioned in its approximate location of use while connected between the two loops 51. FIG. 1 also shows a stop screw support 49 attached to the rearward portion of rear frame member 6 with a stop screw 50 threaded though a centrally located aperture therein. Stop screw support 49 is positioned to allow contact of stop screw 50 with depth stop 48 on telescoping blade guard 4, however, stop screw support 49 and depth stop 48 may be positioned on either the left or right side of undercutting invention 10.

FIG. 1 shows undercutting invention 10 having a planar blade mounting bracket 21 and a planar cutting blade 32 positioned between telescoping blade guard 4 and rear frame member 6. Blade mounting bracket 21 has an internally threaded opening therethrough configured for connection to the externally threaded perimeter of connection bracket 20. Blade mounting bracket 21 is also shown in FIG. 1 to have a pair of opposed attachment holes 36 vertically positioned therethrough. Cutting blade 32 comprises a central opening 34, two opposed attachment holes 36 vertically positioned therethrough and adjacent to central opening 34, as well as two opposed wrench engagement holes 33 evenly spaced between attachment holes 36 and adjacent to central opening 34. It is contemplated for wrench engagement holes 33 be dimensioned and configured to engage a wrench (not shown) for the purpose of removing cutting blade 32 and blade mounting bracket 21 as an assembled unit from side grinder 2. It is also contemplated for two countersunk screws 35 to be upwardly connected through cutting blade 32 to securely fix cutting blade 32 to blade mounting bracket 21 during use. Central opening 34 is dimensioned to fit around the threaded perimeter of connecting bracket 20. In the preferred embodiment it is also contemplated for cutting blade 32 to have a cutting edge with negative hook so that cutting blade 32 will experience less shock when encountering nails (not shown) in materials through which it must cut.

FIG. 1 shows bottom plate 8 being planar and having a rectangular configuration. One side screw 28 is laterally connected in an upright position to opposite sides of bottom plate 8. Also, two upright adjusting brackets 26 upwardly depend from the rearward edge of bottom plate 8 in lateral positions on opposite sides of bottom plate 8. Each adjusting bracket 26 has an elongated vertical slot 30 therethrough for use in adjusting the height of back frame member 6 to allow cutting blade 32 to make cuts of different heights for tile of varying thickness. FIG. 1 also shows a washer 27 which when undercutting invention 10 is assembled is threaded onto side screw 28 and inserted through slot 24 for use in providing easy adjustment of the vertical height of rear frame member 6 relative to base plate 8.

Figure 2:
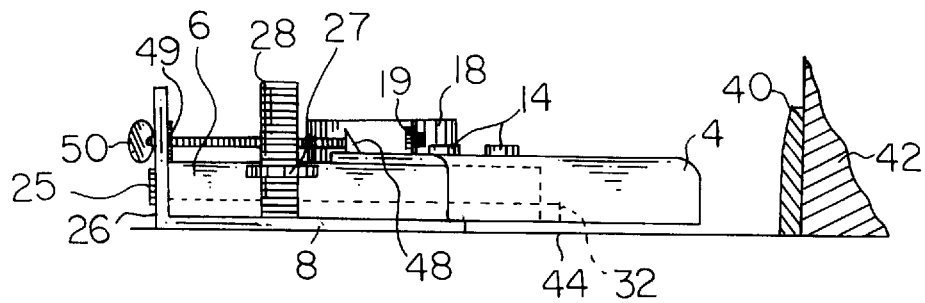
FIG. 2 is a side view of the invention with its telescoping blade guard in an extended position beyond the edge of the cutting blade and with its stationary back frame member in a lowered position against its bottom plate.
Figure 3:
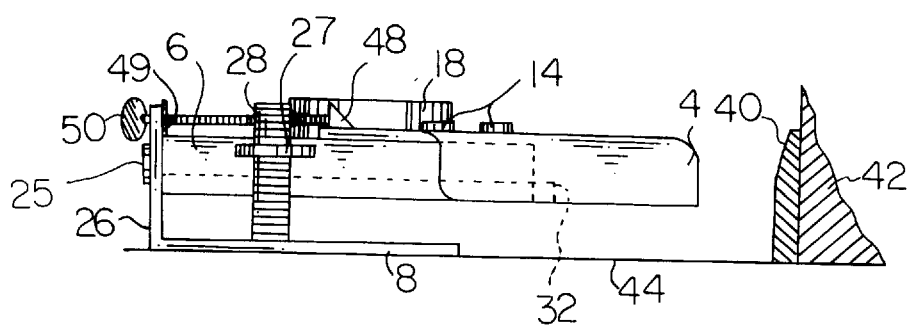
FIG. 3 is a side view of the invention with its telescoping blade guard in an extended position beyond the edge of the cutting blade and with its stationary back frame member in a raised position spaced apart from its bottom plate.

FIG. 2 shows undercutting invention 10 with telescoping blade guard 4 in an extended position beyond the front edge of cutting blade 32 and with back frame member 6 lowered against bottom plate 8. Undercutting invention 10 is positioned above a floor surface 44 and in front of a section of baseboard 40 which is attached to a wall 42. Back frame member 6 is connected to base plate 8 by a back screw 25 inserted through each vertical slot 30 in one of the upright adjusting brackets 26 and holes (not shown) in the rear portion of back frame member 6. FIG. 2 also shows undercutting invention 10 having two top screws 14, one top screw positioned through each top hole 16 in back frame member 6 and one slot 12 in telescoping blade guard 4 to slidably connect back frame member 6 to telescoping blade guard 4. In the preferred embodiment it is contemplated for top screws 14 to comprise shoulder screws. Adjusting washer 27 is shown in FIG. 2 centrally threaded onto one upright side screw 28. In addition, FIG. 2 shows cutting blade 32 positioned within a space defined by telescoping blade guard 4, back frame member 6, and bottom plate 8. Further, FIG. 2 shows collar 18 depending from the upper surface of back frame member 6 with a tightening screw 19 positioned through tightening hole 22, and stop screw 50 attached to upright adjusting bracket 26, FIG. 3 shows undercutting invention 10 with telescoping blade guard 4 in an extended position beyond the front edge of cutting blade 32 and with back frame member 6 in a raised position spaced apart from bottom plate 8. FIG. 3 also shows bottom plate 8 positioned against floor 44 and the forward edge of telescoping blade guard 4 positioned in front of baseboard 40 attached to wall 42. Collar 18 depends upwardly from the top surface of back frame member 6 and top screws 14 slidably secure the rear portion of telescoping blade guard 4 to the front portion of back frame member 6. FIG. 3 also shows adjusting washer 27 threaded near to the top of side screw 28 to raise back frame member 6 at a spaced distance above bottom plate 8. In addition, FIG. 3 shows a back screw 25 inserted through each vertical slot 30 in one of the upright adjusting brackets 26 and holes (not shown) in the rear portion of back frame member 6, as well as and stop screw 50 connected to the rear portion of upright adjusting bracket 26.

Figure 4:
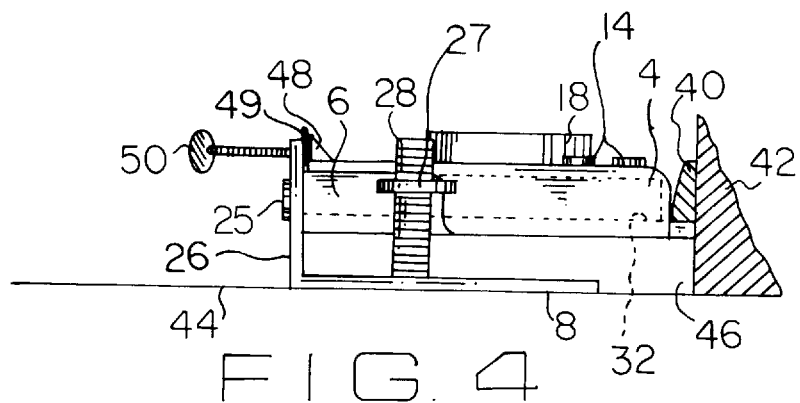
FIG. 4 is a side view of the invention with its stationary back frame member in a raised position spaced apart from its bottom plate, and with its telescoping blade guard in an collapsed position to expose the edge of the cutting blade so that the cutting blade is able to make a cut in the baseboard in front of it.

FIG. 4 shows back frame member 6 in a raised position and spaced apart from bottom plate 8, and with telescoping blade guard 4 in a collapsed position to expose the front edge of cutting blade 32 so that cutting blade 32 can make a cut 46 into baseboard 40 for insertion therein of the edge of a ceramic floor tile (not shown). FIG. 4 also shows collar 18 upwardly depending from the top surface of back frame member 6, top screws 14 slidably securing the rear portion of telescoping blade guard 4 to the front portion of back frame member 6, adjusting washer 27 threaded upon side screw 28, a back screw 25 inserted through each vertical slot 30 in one of the upright adjusting brackets 26 and holes (not shown) in the rear portion of back frame member 6, as well as stop screw 50 connected to the rear portion of upright adjusting bracket 26. Although not shown, it is contemplated for nuts to be used to secure top screws 14 and back screws 25 in place.

To assemble undercutting invention 10, the internally threaded center hole of blade mounting bracket 21 would be attached to the external threads on the outer perimeter of connecting bracket 20. Collar 18 would then be positioned around the perimeter of blade mounting bracket 21 and securely fixed thereto with tightening screw 19 positioned through tightening hole 22 to attach back frame member 6 to side grinder 2. Thereafter, cutting blade 32 would be connected to blade mounting bracket 21 with countersunk screws 35 and nuts (not shown). Bottom plate 8 would be connected to back frame member 6 with back screws 25 being inserted through vertical slots 30 in upright adjusting brackets 26 and secured with nuts (not shown), as well as washers 27 being inserted through horizontal slots 24 and threaded onto upright side screws 28. Telescoping blade guard 4 would then be slidably connected over back frame member 6 with top screws 14 connected through top holes 16 and slots 12. Thereafter, return spring 52 could be connected between loop 51 on telescoping blade guard 4 and either a second loop 51 attached to collar 18 as shown in FIG. 1, or a second loop 51 positioned in a convenient location on back frame member 6.

In the preferred embodiment it is contemplated for all of the components of undercutting invention 10 to be made from metal, plastic, or a combination of both materials. Also, in the preferred embodiment it is contemplated for cutting blade 32 to range in diameter between four-and-one-half inches and five-and-one-half inches, to have carbide cutting tips evenly dispersed about its perimeter, and for center opening 34 to be approximately seven-eighths of an inch in diameter. To use undercutting invention 2, once assembled onto connecting bracket 20, one would loosen back screws 25 and use adjusting washer 27 to raise or lower back frame member 6 above bottom plate 8 to adjust the height of cuts made by cutting blade 32. Once the correct height is obtained, back screws 25 would be tightened in place with nuts (not shown) to fix the spaced apart distance between back frame member 6 and bottom plate 8. Then the user (not shown) would adjust the depth of each cut made in baseboard 40 by cutting blade 32 through the shortening and lengthening of the amount of stop screw 50 positioned between depth stop 48 and stop screw support 49. After activating side grinder 2 to rotate connecting bracket 20 so as to turn cutting blade 32, the user (not shown) would place the forward edge of telescoping blade guard 4 in contact with the outside surface of baseboard 40. As undercutting invention 10 is pushed further forward against baseboard 40, telescoping blade guard 4 progressively collapses until stop screw 50 contacts depth stop 48. As telescoping blade guard 4 is collapsing, cutting blade 32 is exposed for cutting through the lower portion of baseboard 40. While in contact with baseboard 40, undercutting invention 10 may be moved in both left and right directions to undercut a sufficient portion of baseboard 40 to allow placement thereunder of the edge of ceramic floor tiles (not shown) to eliminate the need for perimeter grout lines adjacent to baseboard 40 or exposure of unevenly cut and trimmed edges of ceramic floor tiles (not shown).

What is claimed is:

1. An undercutting attachment for a conventional high speed, hand-held mini-grinder having an externally threaded rotating connecting bracket attached thereto, said undercutting attachment for use by people laying tile to undercut baseboards and door trim for insertion of edges of tile thereunder for elimination of grout lines which would otherwise be necessary around the perimeter of a tiled surface and exposure of unevenly cut and trimmed tile edges, said attachment comprising a U-shaped telescoping blade guard having a front portion, a rear portion, and two arms, said front portion having a downwardly depending front edge, said front edge having a bottom perimeter, and an elongated substantially rectangular cutout centrally through said bottom perimeter, said telescoping blade guard also having a pair of parallel elongated slots therethrough, one of said slots being positioned through each of said arms; a stationary back frame member having a forward portion, a rearward portion, a downwardly depending rear edge, and downwardly depending sides, said forward portion having a leading edge and each of said sides having a horizontal slot therethrough, said back frame member also having two pairs of top holes, one of said top holes in each pair being positioned forward of the other of said top holes in its pair, said back frame member also having a collar centrally and upwardly depending therefrom adjacent to said leading edge; a planar bottom plate having a back edge, a front edge, a pair of side screws laterally positioned thereon in a central position between said back edge and said front edge, and two upright adjusting brackets laterally connected to said back edge in positions spaced apart from one another, each of said adjusting brackets having a vertical slot therethrough; a blade mounting bracket having an internally threaded center opening therethrough, said blade mounting bracket dimensioned for attachment to said connecting bracket attached to said grinder; a pair of countersunk screws; a cutting blade having a cutting edge with negative hook, said cutting blade being secured to said mounting bracket with said countersunk screws so that as said grinder is activated said connecting bracket rotates and causes said mounting bracket to rotate said cutting blade attached thereto for even undercutting of baseboards and door trim adjacent to a tiled surface.

2. The undercutting attachment of claim 1 further comprising a depth stop, an externally threaded stop screw, and a stop screw support having an internally threaded opening therethrough, said depth stop connected to said rear portion of said telescoping blade guard, said stop screw support connected to said rearward portion of said back frame member, and said stop screw threaded a predetermined distance into said internally threaded opening during use to set a minimum depth to which said telescoping blade guard can be collapsed to expose said cutting blade for cutting said baseboards and said door trim.

3. The attachment of claim 1 wherein said cutting blade further comprises a pair of opposed wrench holes and a pair of opposed attachment holes, and wherein said wrench holes are positioned between said attachment holes, said wrench holes and said attachment holes each extending through said cutting blade for ease in removing said cutting blade from said connecting bracket.

4. The attachment of claim 1 wherein said means for engaging said elongated slots comprises at least two pairs of shoulder screws.

5. The attachment of claim 1 wherein said cutting blade ranges in diameter ranging between four-and-one-half inches and five-and-one-half inches.

6. An undercutting attachment for a convention high speed, hand-held mini-grinder having an externally threaded rotating connecting bracket attached thereto, said undercutting attachment for use by people laying tile to undercut baseboards and door trim for insertion of edges of tile thereunder for eliminating of grout lines which would otherwise be necessary around the perimeter of a tile surface and exposure of unevenly cut and trimmed tile edges, said attachment comprising a telescoping blade guard having an upper surface with a downwardly depending front edge, said front edge having a bottom perimeter and an elongated substantially rectangular cutout centrally through said bottom perimeter, said upper surface of said telescoping blade guard also having a pair of parallel elongated slots laterally therethrough, adjacent to said front edge; a stationary back frame member having a downwardly depending rear edge, downwardly depending sides, and each of said sides having a horizontal slot therethrough, said back frame member also having a means for engaging said elongated slots which allows said telescoping blade guard to move rearwardly and a collar upwardly depending therefrom; a planar bottom plate; and adjusting means connected to said bottom plate for raising and lowering said back frame member relative to said bottom plate and for securing said back frame member into a fixed position relative to said bottom plate during use; a blade mounting bracket having an internally threaded center opening therethrough, said blade mounting bracket dimensioned for attachment to said connecting bracket attached to said grinder; a cutting blade having a cutting edge with negative hook; a means for attaching said cutting blade to said mounting bracket so that as said grinder is activated said connecting bracket rotates and said mounting bracket is caused to rotate said cutting blade attached thereto for even undercutting of baseboards and door trim adjacent to a tiled surface.

7. The undercutting attachment of claim 6 further comprising a depth stop, an externally threaded stop screw, and a stop screw support having an internally threaded opening therethrough, said depth stop, said stop screw support, and said stop screw all being configured, dimensioned, and positioned to set a maximum depth to which said telescoping blade guard can be collapsed to expose said cutting blade for cutting said baseboards and said door trim.

8. The attachment of claim 6 wherein said cutting blade further comprises a pair of opposed wrench holes and a pair of opposed attachment holes, and wherein said wrench holes are positioned between said attachment holes, said wrench holes and said attachment holes each extending through said cutting blade for ease in removing said cutting blade from said connecting bracket.

9. The attachment of claim 6 wherein said means for engaging said elongated slots comprises at least two pairs of shoulder.

10. The attachment of claim 6 wherein said cutting blade ranges in diameter ranging between four-and-one-half inches and five-and-one-half inches.

* * * * *